United States Patent
Stefanovic et al.

(10) Patent No.: US 6,707,279 B2
(45) Date of Patent: Mar. 16, 2004

(54) INDUCTION GENERATOR CONTROL WITH MINIMAL SENSOR REQUIREMENTS

(75) Inventors: Victor R. Stefanovic, Afton, VA (US); John Michael Miller, Saline, MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 88 days.

(21) Appl. No.: 09/769,901

(22) Filed: Jan. 26, 2001

(65) Prior Publication Data

US 2002/0101221 A1 Aug. 1, 2002

(51) Int. Cl.[7] ............... H02H 9/06; H02P 11/00; H02P 9/00; H02P 9/46
(52) U.S. Cl. ............... 322/47; 322/28
(58) Field of Search ............ 322/24, 28, 47, 322/36

(56) References Cited

U.S. PATENT DOCUMENTS

| | | | |
|---|---|---|---|
| 4,678,248 A | | 7/1987 | Depenbrock |
| 5,502,360 A | * | 3/1996 | Kerkman et al. ........... 318/805 |
| 5,717,305 A | * | 2/1998 | Seibel et al. ............... 318/432 |
| 5,740,880 A | * | 4/1998 | Miller ....................... 180/446 |
| 5,923,144 A | * | 7/1999 | Seibel et al. ............... 318/805 |
| 5,965,995 A | * | 10/1999 | Seibel et al. ............... 318/432 |
| 5,977,679 A | | 11/1999 | Miller et al. |
| 6,014,007 A | * | 1/2000 | Seibel et al. ............... 318/798 |
| 6,094,364 A | * | 7/2000 | Heikkila .................... 318/807 |
| 6,107,774 A | * | 8/2000 | Yamada et al. ............. 318/432 |
| 6,335,604 B1 | * | 1/2002 | Kataoka ..................... 180/6.44 |
| 6,417,650 B1 | * | 7/2002 | Stefanovic et al. ........... 322/47 |

FOREIGN PATENT DOCUMENTS

| | | | |
|---|---|---|---|
| JP | 408080099 A | * | 3/1996 |
| JP | 02000324878 A | * | 11/2000 |

OTHER PUBLICATIONS

I. Takahashi et al., "A New Quick–Response and High–Efficiency Control Strategy of an Induction Motor", IEEE–IA Transactions, Sep./Oct. 1986, pp. 820–827, vol. IA–22, No. 5.

M. Depenbrock, "Direct Self–Control (DSC) of Inverter–Fed Induction Machine", IEEE Transactions on Power Electronics, Oct. 1988, pp. 420–429, vol. 3, No. 4.

C. Lascu et al., "A Modified Direct Torque Control (DTC) for Induction Motor Sensorless Drive", IEEE–IAS, Jan. 1988, pp. 415–422.

* cited by examiner

*Primary Examiner*—Burton S. Mullins
*Assistant Examiner*—Julio C. Gonzalez
(74) *Attorney, Agent, or Firm*—Jennifer M. Stec

(57) ABSTRACT

A method of controlling an induction generator such as an automotive starter-alternator or a windmill is disclosed. The method comprises using a minimal number of current sensors and controlling at least one of a machine flux, an output voltage and generator torque, based on the stator or rotor flux magnitude and position. This method comprises measuring a plurality of current amounts; transforming them into a two phase reference system; measuring a DC voltage; measuring voltage amounts in the generator; transforming the plurality of voltage amounts into the two phase reference system; calculating a flux in the generator; comparing the calculated flux magnitude with a desired flux; determining a d-axis voltage; determining a desired torque amount; comparing the desired torque amount with an estimated torque amount; determining a q-axis voltage; and transforming the d-axis voltage and the q-axis voltage to stationary reference frame n-phase voltages using the position of the flux.

20 Claims, 3 Drawing Sheets

INDUCTION GENERATOR CONTROL WITH MINIMAL SENSOR REQUIREMENTS

BACKGROUND OF THE INVENTION

1. Field of the Invention

The present invention relates to a method of controlling the output voltage of an induction generator.

2. Discussion of the Related Art

Direct Torque Control (DTC) was developed to simplify the control of induction motors and improve their dynamic performance. The DTC concept was first explained in two independent, almost simultaneous publications. The first publication was a paper by Takahashi et al., entitled "A New Quick Response and High Efficiency Strategy of an Induction Motor", Conf. Record, IEEE-IAS 1985 Ann. Meeting, pp. 495–502. The second publication was in Germany by Depenbrock entitled "Direct Self Control for High Dynamic Performance of Inverter Fed AC Machines", ETZ Archiv, Vol. 7, No. 7, 1985, pp. 211–218. Subsequently, various variations of this concept, always applied to induction motors, were presented.

One example of an alternate method of DTC application to induction motors is given in the paper by Lascu et al., entitled "A Modified Direct Torque Control (DTC) for Induction Motor Sensorless Drive", IEEE-IAS 1998 Ann. Meeting, pp. 415–422.

SUMMARY OF THE INVENTION

The present invention seeks to provide a method of controlling an induction generator that is simpler and less expensive than previous methods.

The invention is primarily concerned with controlling an induction generator with a phase number equal to or greater than 3.

Most of the proven benefits of DTC concept can be realized if the method is modified so that it can be used to control an induction generator. This is especially true in cases where the generator shaft torque (also known as the loading torque on a prime mover) needs to be controlled. These types of situations are encountered in automotive applications, where the retarding torque that the generator exerts on the crankshaft of an Internal Combustion Engine (ICE) needs to be controlled. This situation is also encountered in windmills, where the retarding torque of the generator needs to be regulated to prevent a windmill from stalling.

This application discloses a modified method of Direct Torque Control that is applied to induction generators.

The present invention proposes the use of a minimal number of current sensors and the elimination of current regulators while controlling the generator flux and output voltage.

One method of controlling the induction generator according to the present invention is by using DTC. DTC differs from vector control in that vector control requires current regulators, while DTC does not. In its original form, DTC only required regulation of torque and flux. In this application, the invention discloses how to regulate the machine flux and either the torque or the generator output voltage.

The present invention deals with control of induction generators and is inspired by DTC concepts, previously applied only to motor control. The features that distinguish this invention from the prior systems include:

1. DTC is used to control induction generators;
2. Both generator torque and generator output voltage are controlled; and
3. No current regulators are used when defining the generator input voltages ($V_d$ and $V_q$).

One application of the present invention is to an induction generator for automotive use and specifically to an induction machine automotive starter-alternator. Another application of the method of the invention is with a windmill.

The invention is also applicable to an induction machine with an electronically selectable number of poles.

An object of the present invention is to realize a minimal sensor implementation of a wide constant power speed range of a toroidally wound induction machine starter alternator (S/A), and specifically for generator mode voltage regulation.

Another object of the present invention is to provide a control method that is applicable to a system where an inverter is used to control a generator where the speed is variable and is not controlled. In the case of an automotive application, the speed is dependent on the speed of the automotive engine and thus is not controlled. In the case of a windmill, the speed is dependent on the wind speed passing by the blades of the windmill that is also not controlled.

Yet another objective of this invention is to control the generator operating point and specifically the loading torque the generator exerts on the prime mover, such as an internal combustion engine or a windmill.

These and other objects of the invention can be accomplished by various methods of controlling an induction generator, as will be described. The objects of the invention can be accomplished by a method of controlling an induction generator using a minimal number of current sensors and without requiring current regulators or position sensors.

This method comprises the steps of measuring a plurality of current amounts in the generator; transforming the plurality of current amounts into a two phase reference system; measuring a DC voltage supplied to an inverter; measuring a plurality of voltage amounts in the generator using voltage sensors; transforming the plurality of voltage amounts into the two phase reference system; calculating a flux in the generator using the currents and the voltages obtained by said steps of transforming so as to obtain a magnitude and position of the flux; comparing the calculated flux magnitude with a desired flux to determine a flux error amount; determining a d-axis voltage so as to reduce the flux error amount; determining a desired torque amount by obtaining a desired generator shaft torque amount and converting the desired generator shaft torque amount to the desired torque amount; comparing the desired torque amount with an estimated torque amount to determine a torque error amount, the torque error amount being input to a torque regulator; determining a q-axis voltage so as to reduce a torque error amount; and transforming the d-axis voltage and the q-axis voltage to stationary reference frame n-phase voltages using the position of the flux, wherein n is substantially equal to a number of generator phases.

The objects of the invention can also be accomplished by a method of controlling an induction generator using current sensors. The method of this invention includes the steps of measuring a plurality of current amounts in the generator using a plurality of current sensors; transforming the plurality of current amounts into a two phase reference system; measuring a DC voltage supplied to an inverter, the inverter being operatively connected to the generator; measuring a plurality of voltage amounts in the generator using a plurality of voltage sensors; transforming the plurality of voltage amounts into the two phase reference system; calculating a flux in the generator using the currents and the voltages obtained by said steps of transforming so as to obtain a magnitude and position of the flux; comparing the calculated flux magnitude with a desired flux to determine a flux error amount, the flux error amount being input to a flux regulator; determining a d-axis voltage so as to reduce the flux error amount; comparing a desired DC voltage with the measured DC voltage to determine a voltage error amount, the voltage error amount being input to a voltage regulator; determining a desired torque amount so as to reduce the voltage error amount; comparing the desired torque amount with an estimated torque amount to determine a torque error amount, the torque error amount being input to a torque regulator; determining a q-axis voltage so as to reduce a torque error amount; and transforming the d-axis voltage and the q-axis voltage to stationary reference frame, n-phase voltages using the position of the flux, wherein n is substantially equal to a number of generator phases.

It is also possible to use the magnitude and position of the rotor flux instead of the magnitude and position of stator flux as rotor flux magnitude and position can be calculated from the stator flux.

BRIEF DESCRIPTION OF THE DRAWINGS

The above and other objects and features of the present invention will be clearly understood from the following description with respect to the preferred embodiment thereof when considered in conjunction with the accompanying drawings and diagrams, in which.

DETAILED DESCRIPTION OF THE PREFERRED EMBODIMENTS

Embodiments of the present invention are described in further detail with reference to the accompanying drawings.

The present invention deals with a control of an induction generator having a rotor and a stator that has a plurality of phase windings. The number of phases is equal to or greater than 3. A number of current sensors are operatively connected to the induction generator. An inverter having a plurality of solid-state switches and a control system is also used with the induction generator. The inverter can have the same number of phases as the induction generator. The inverter is connected to selectively energize the phase windings. A programmable microprocessor, such as a digital signal processor, is operatively connected to the inverter and includes a program to implement the control of the induction generator.

Figure 1:
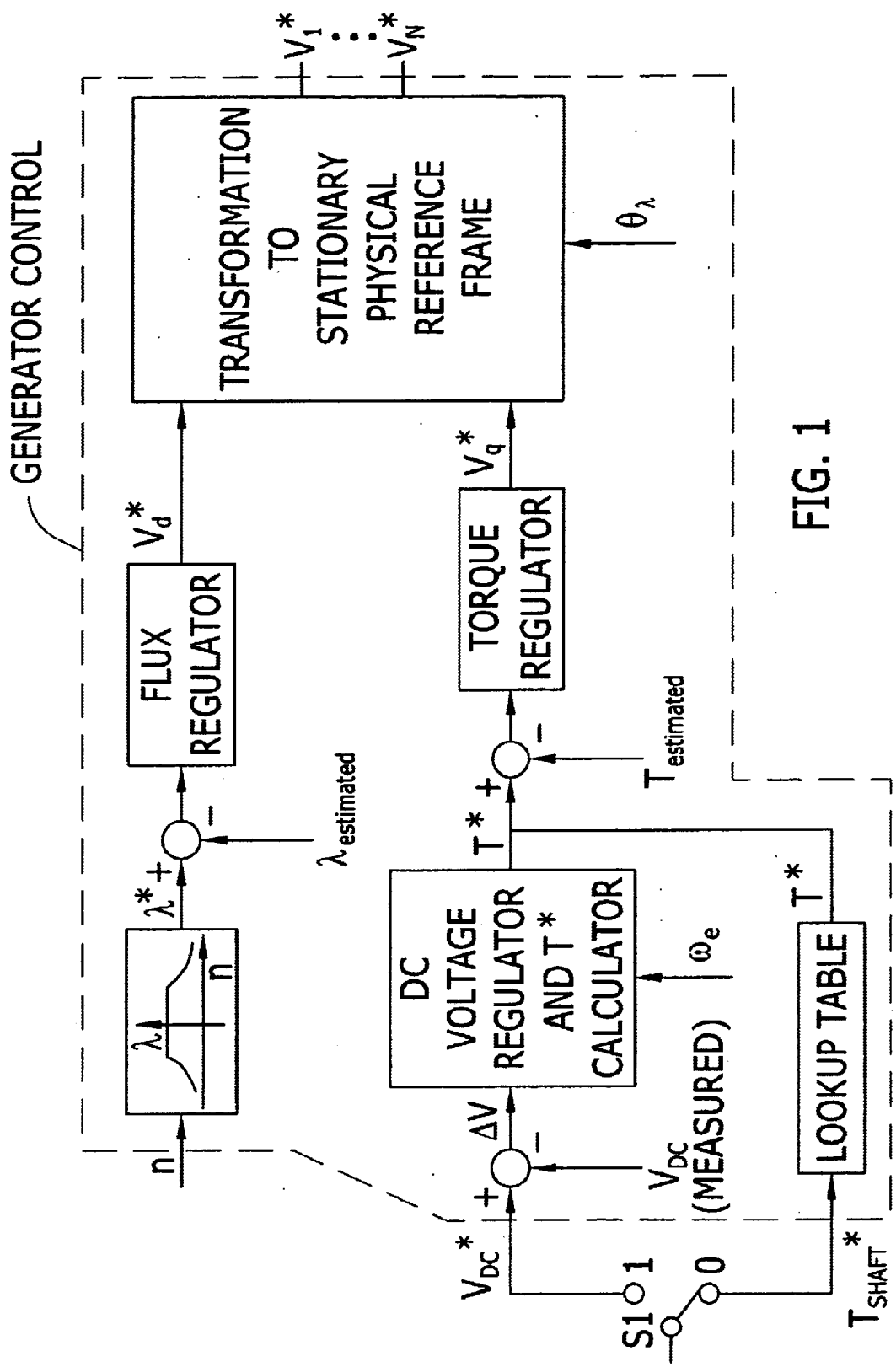
FIG. 1 is a schematic illustration of one method of determining the voltage in the d-axis and the voltage in the q-axis for an induction generator according to an embodiment of the present invention.

According to one embodiment, the method of controlling an induction generator is shown in FIG. 1. To control the induction generator, a d-axis voltage and a q-axis voltage must be calculated and transformed into stationary reference frame voltages.

The DC voltage $V_{DC}$ (measured) of the inverter, operatively connected to the generator, is also measured. The DC voltage can be measured, for example, at the terminals of the inverter or a power supply such as a battery.

FIG. 1 also illustrates methods of determining the d-axis voltage $V_d{}^*$ and the q-axis voltage $V_q{}^*$. In the d-axis voltage line, one method of determining the desired flux $\lambda^*$ is to use the speed of a crankshaft of an internal combustion engine or a windmill turbine, tied to a generator. As shown schematically in FIG. 1, the speed n is mapped into the desired flux based on a speed-flux curve. It is also possible to use other speed measurements, for example, the speed of the generator shaft. This generates the desired flux $\lambda^*$ that is then compared with the estimated flux $\lambda_{estimated}$. Further, it is also possible to determine the desired generator flux using other methods, well known in the art.

The magnitude and position of the estimated generator flux, $\lambda_{estimated}$ and $\theta_\lambda$, respectively, are calculated using values obtained by a plurality of current and voltage sensors. The calculation is done according to the method described below in connection with FIG. 2.

Once obtained, the estimated flux magnitude $\lambda_{estimated}$ is compared with a desired flux $\lambda^*$ to determine a flux error amount $\Delta\lambda$. The d-axis voltage $V_d{}^*$ is then selected, as the output of the flux regulator so as to reduce the flux error amount $\Delta\lambda$.

Throughout the specification, various methods of regulation are contemplated including using a proportional integral regulator, a derivative regulator, a sample data regulator, a predictive regulator, a non-linear regulator and types of other regulators well known in the art. Also, in each regulation loop, the specific type of error (flux, voltage, torque or current) is reduced preferably to zero to achieve the desired output value that continues to be used in the control method.

FIG. 1 also illustrates the basic process to determine the q-axis voltage $V_q{}^*$. A desired or commanded voltage $V_{DC}{}^*$ is initially compared with the measured DC voltage $V_{DC\ measured}$ to determine a voltage error amount $\Delta V$. As described above, one way of obtaining the measured DC voltage $V_{DC\ measured}$ is to measure the inverter DC input voltage. The voltage error amount $\Delta V$ is then input to a DC voltage regulator. A desired torque amount $T^*$ is then determined by dividing the output of the voltage regulator with the speed of the generator flux, $\omega_e$. The desired torque amount $T^*$ is selected so as to reduce the voltage error amount $\Delta V$ and is then compared with an estimated torque amount $T_{estimated}$ to determine the torque error amount $\Delta T$. The torque error amount $\Delta T$ is then input to a torque regulator. The q-axis voltage $V_q{}^*$ is then determined, as the output of the torque regulator, so as to reduce the torque error amount $\Delta T$.

Once the d-axis voltage $V_d{}^*$ and the q-axis voltage $V_q{}^*$ are obtained as shown in FIG. 1, they are transformed into stationary reference frame voltages using the position of the stator flux $\theta_\lambda$ as is known in the art. The box labeled "Transformation to Stationary Physical Reference Frame" schematically illustrates this transformation. The outputs from this transformation are the respective voltages $V_1$ to $V_n$, n being the number of the generator phases. For a three-phase generator, these voltages would be $V_1$, $V_2$, and $V_3$ (also sometimes referred to as $V_a$, $V_b$, and $V_c$).

The transformation is a two stage process wherein $V_d{}^*$ and $V_q{}^*$ are transformed into the two phase stationary reference frame to yield $V_\alpha$ and $V_\beta$ which are then transformed into the n phase voltages. These transformation processes are well known in the art.

Regarding the q-axis voltage line, it is also possible to include a switch S1 (hardware or software switch) that can be selected to guide the flow of the control method depending on a desired mode of operation. When the switch S1 is in position 1, the q-axis voltage line operates in a manner as described above.

When the switch S1 is in position 0, the default position, the control system bypasses the voltage comparison and the DC voltage regulator steps. Instead, the method uses the generator desired shaft torque $T_{SHAFT}$ and calculates the desired torque T* through an interpolation mapping function that includes compensating for the torque losses in the generator. Other methods of calculating the desired torque T* from the desired generator shaft torque, well known in the art, are also possible. The desired electromagnetic torque T* is then compared with the estimated torque as described above.

This allows a choice of voltage regulation or torque regulation at the systems level, especially for a case of an integrated starter generator.

It is also possible to calculate the desired torque by using the lookup table instead of the DC voltage regulator, with or without the switch.

Figure 2:
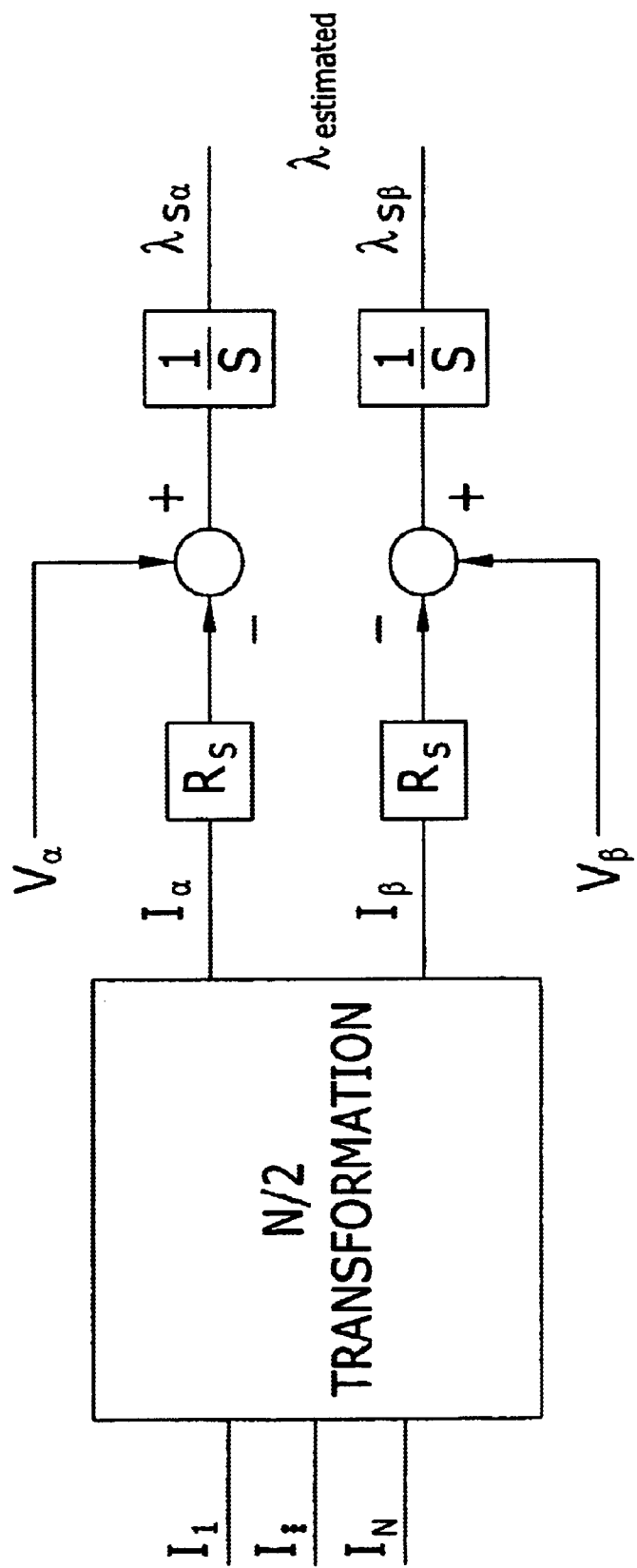
FIG. 2 is a schematic illustration of one method of estimating the flux according to an embodiment of the present invention.
Figure 3:
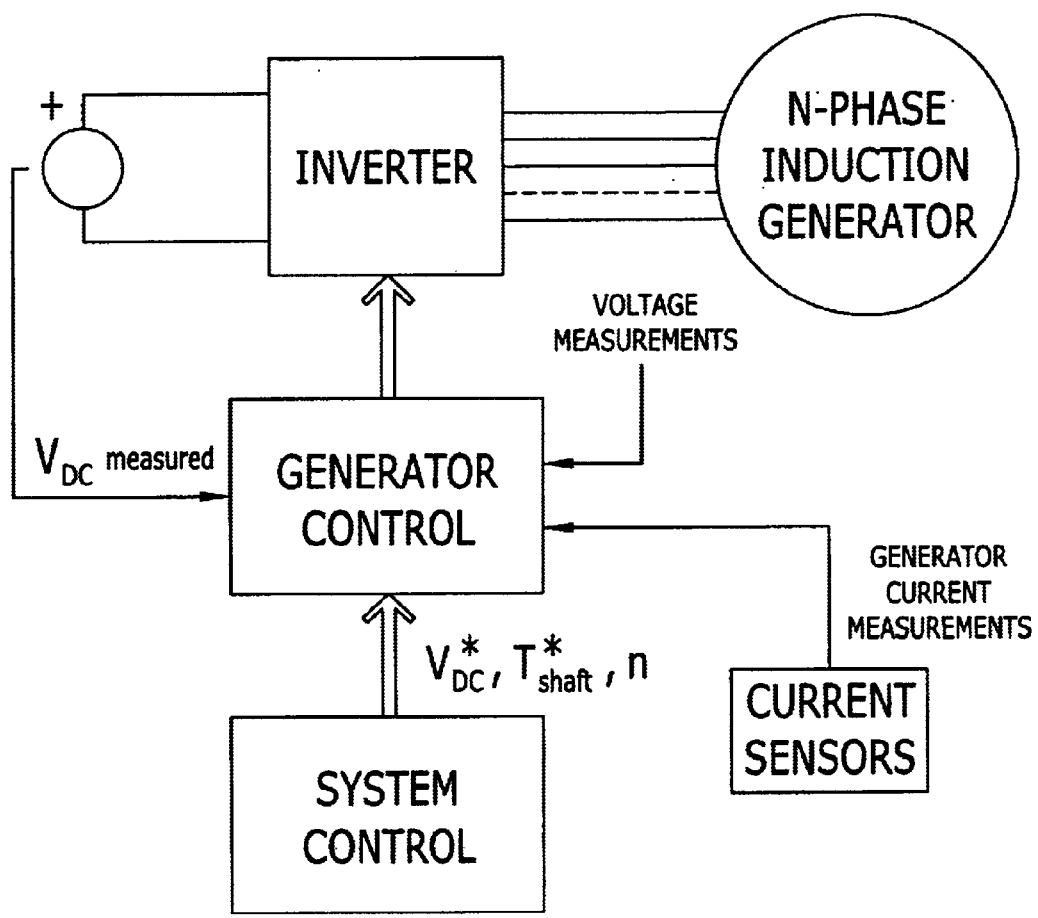
FIG. 3 is a schematic illustration of the overall system including the n-phase induction generator, inverter, generator control with various inputs.

FIG. 2 illustrates schematically the method of estimating the position and magnitude of the flux in the generator for an n phase machine. The current sensors measure the n phase different currents $I^1 \ldots I_N$ in the generator. These are transformed into a two phase reference frame α and β using an N/2 transformation as is well known in the art.

For example, in a three phase machine, currents $I_a$, $I_b$ and $I_c$, can be measured and transformed into two currents $I_\alpha$ and $I_\beta$. Additionally, in order to save using an additional current sensor, currents $I_a$ and $I_b$ can be measured and $I_c$ can be calculated using the equation $I_c = -I_a - I_b$.

Next, the two phase reference frame currents $I_\alpha$ and $I_\beta$ are multiplied by the stator resistance Rs to determine the resistive voltage drop. This value is then combined with the voltages $V_\alpha$ and $V_\beta$ to obtain $V_\alpha - I_\alpha Rs$ and $V_\beta - I_\beta Rs$. These quantities are then integrated in the respective boxes 1/S to obtain the stator flux in the two phase reference frame, $\lambda_{S\alpha}$ and $\lambda_{S\beta}$. Once these two flux values are determined, the magnitude of the stator flux, $\lambda_{S\ estimated}$, can be estimated by the following formula:

$$|\lambda_{S\ estimated}| = ((\lambda_{S\alpha})^2 + (\lambda_{S\beta})^2)^{1/2}$$

Also, the position of the stator flux $\theta_{\lambda S}$ can be determined from the equation:

$$\tan \theta_{\lambda S} = (\lambda_{S\beta})/(\lambda_{S\alpha})$$

It is also possible to use the magnitude and position of the rotor flux instead of the magnitude and position of stator flux as rotor flux magnitude and position can be calculated from the stator flux magnitude and position. For example, it is possible to calculate the rotor flux in the two phase reference frame using the following formulas:

$$\lambda_{R\alpha} = (L_m/L_R) \times \lambda_{S\alpha} - \xi \times L_s \times I_\alpha$$

$$\lambda_{R\beta} = (L_m/L_R) \times \lambda_{S\beta} - \xi \times L_s \times I_\beta$$

wherein $\xi = 1 - ((L_m^2)/(L_s \times L_R))$
and the rotor inductance is $L_R$, the mutual inductance is $L_m$, and the stator inductance is $L_s$.

The rotor flux magnitude $\lambda_R$ and position $\theta_{\lambda R}$ can then be calculated by the formulas:

$$|\lambda_R| = ((\lambda_{R\alpha})^2 + (\lambda_{R\beta})^2)^{1/2}$$

$$\tan \theta_{\lambda R} = (\lambda_{R\beta})/(\lambda_{R\alpha})$$

It is also possible to calculate the speed of the generator flux, $\omega_e$ using the following equation:

$$\omega_e = [(\lambda_{S\alpha} \times (V_{S\beta} - I_{S\beta} Rs)) - (\lambda_{S\alpha} \times (V_{S\alpha} - I_{S\alpha} Rs))]/((\lambda_{S\alpha})^2 + (\lambda_{S\beta})^2)$$

The estimated torque amount $T_{estimated}$ described in FIG. 1 can be calculated using various methods. One method of calculating the estimated torque amount $T_{estimated}$ is according to the following equation:

$$T_{estimated} = (3/2) \times (p/2) \times ((\lambda_{S\alpha} \times I_{S\beta}) - (\lambda_{S\beta} \times I_{S\alpha}))$$

wherein p is the number of generator poles, $I_{S\alpha}$ and $I_{S\beta}$ are the generator stator currents obtained from the measured currents and $\lambda_{S\alpha}$ and $\lambda_{S\beta}$ so are the estimated stator fluxes in the two phase stationary reference frame.

It is well known in the art that other methods of calculating the estimated torque amount are possible and these methods can be used in connection with this embodiment.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

What is claimed is:

1. A method of controlling an induction generator, said method comprising the steps of:

measuring a plurality of current amounts in the generator using a plurality of current sensors;

transforming the plurality of current amounts into a two phase reference system;

measuring a DC voltage supplied to an inverter, the inverter being operatively connected to the generator;

measuring a plurality of generator voltages;

transforming the plurality of generator voltages into the two phase reference system;

calculating a flux in the generator using the currents and the voltages obtained by said steps of transforming so as to obtain a magnitude and position of the flux;

comparing the calculated flux magnitude with a desired flux to determine a flux error amount, the flux error amount being input to a flux regulator;

determining a d-axis voltage so as to reduce the flux error amount;

comparing a desired DC voltage with the measured DC voltage to determine a voltage error amount, the voltage error amount being input to a voltage regulator;

determining a desired torque amount so as to reduce the voltage error amount;

comparing the desired torque amount with an estimated torque amount to determine a torque error amount, the torque error amount being input to a torque regulator;

determining a q-axis voltage so as to reduce a torque error amount; and transforming the d-axis voltage and the q-axis voltage to stationary reference frame, n-phase voltages using the position of the flux, wherein n is substantially equal to a number of generator phases.

2. A method as defined in claim 1, wherein said step of calculating a flux in the generator using the currents and the voltages obtained by said steps of transforming so as to obtain a magnitude and position of the flux, will result in obtaining a stator flux in the generator.

3. A method as defined in claim 2, further comprising the steps of using the stator flux magnitude in said step of comparing the calculated flux magnitude with a desired flux; and using the stator flux position in said step of transforming the d-axis voltage and the q-axis voltage to stationary reference frame n-phase voltages using the position of the flux, wherein n is substantially equal to a number of generator phases.

4. A method as defined in claim 2, further comprising the steps of calculating a rotor flux in the generator using calculated stator flux in the two phase reference frame so as to obtain a magnitude and position of the rotor flux;

using the rotor flux magnitude said step of comparing the calculated flux magnitude with a desired flux; and using the rotor flux position in said step of transforming the d-axis voltage and the q-axis voltage to stationary reference frame voltages n-phase voltages using the position of the flux, wherein n is substantially equal to a number of generator phases.

5. A method as defined in claim 1, further comprising the steps of:

determining the desired torque amount by selectively switching between 1) said steps of comparing a desired DC voltage with the measured DC voltage to determine a voltage error amount and determining a desired torque amount, as an output of the voltage regulator, so as to reduce the voltage error amount; and 2) obtaining a desired generator shaft torque amount and converting the desired generator shaft torque amount to the desired torque amount by a mapping function.

6. A method of controlling an induction generator, said method comprising the steps of:

measuring a plurality of current amounts in the generator using a plurality of current sensors;

transforming the plurality of current amounts into a two phase reference system;

measuring a DC voltage supplied to an inverter, the inverter being operatively connected to the generator;

measuring a plurality of current amounts in the generator using a plurality of current sensors;

transforming the plurality of current amounts into a two phase reference system;

calculating a flux in the generator using the currents and the voltages obtained by said steps of transforming so as to obtain a magnitude and position of the flux;

comparing the calculated flux magnitude with a desired flux to determine a flux error amount, the flux error amount being input to a flux regulator;

determining a d-axis voltage so as to reduce the flux error amount;

determining a desired torque amount by obtaining a desired generator shaft torque amount and converting the desired generator shaft torque amount to the desired torque amount by a mapping function;

comparing the desired torque amount with an estimated torque amount to determine a torque error amount, the torque error amount being input to a torque regulator;

determining a q-axis voltage so as to reduce a torque error amount; and transforming the d-axis voltage and the q-axis voltage to stationary reference frame n-phase voltages using the position of the flux, wherein n is substantially equal to a number of generator phases.

7. A method as defined in claim 6, further comprising the steps of:

determining the desired torque amount by selectively switching between 1) said step of determining the desired torque amount by obtaining a desired generator shaft torque amount and converting the generator shaft torque amount to the desired torque amount by a mapping function; and 2) comparing a desired DC voltage with the measured DC voltage to determine a voltage error amount and determining the desired torque amount, as an output of a voltage regulator, so as to reduce the voltage error amount.

8. A method as defined in claim 6, wherein said step of calculating a flux in the generator using the currents and the voltages obtained by said steps of transforming so as to obtain a magnitude and position of the flux, will result in obtaining a stator flux in the generator.

9. A method as defined in claim 8, further comprising the steps of using the stator flux magnitude in said step of comparing the calculated flux magnitude with a desired flux; and using the stator flux position in said step of transforming the d-axis voltage and the q-axis voltage to stationary reference frame n-phase voltages using the position of the flux, wherein n is substantially equal to a number of generator phases.

10. A method as defined in claim 8, further comprising the steps of calculating a rotor flux in the generator using calculated stator flux magnitudes in the two phase reference frame so as to obtain a magnitude and position of the rotor flux;

using the rotor flux magnitude said step of comparing the calculated flux magnitude with a desired flux; and using the rotor flux position in said step of transforming the d-axis voltage and the q-axis voltage to stationary reference frame n-phase voltages using the position of the flux, wherein n is substantially equal to a number of generator phases.

11. A method of controlling an induction generator, said method comprising the steps of:

measuring a plurality of current amounts in the generator using a plurality of current sensors;

transforming the plurality of current amounts into a two phase reference system;

measuring a DC voltage supplied to an inverter, the inverter being operatively connected to the generator;

obtaining a desired d-axis voltage and a desired q-axis voltage;

transforming the desired d-axis voltage and the desired q-axis voltage into the two phase stationary reference system using a generator flux position;

calculating a flux in the generator using the currents and the voltages obtained by said steps of transforming so as to obtain a magnitude and position of the flux;

comparing the calculated flux magnitude with a desired flux to determine a flux error amount, the flux error amount being input to a flux regulator;

determining a new d-axis voltage so as to reduce the flux error amount;

comparing a desired DC voltage with the measured DC voltage to determine a voltage error amount, the voltage error amount being input to a voltage regulator;

determining a desired torque amount so as to reduce the voltage error amount;

comparing the desired torque amount with an estimated torque amount to determine a torque error amount, the torque error amount being input to a torque regulator;

determining a new q-axis voltage so as to reduce a torque error amount; and transforming the new d-axis voltage and the new q-axis voltage to stationary reference frame n-phase voltages using the position of the flux, wherein n is substantially equal to a number of generator phases.

12. A method as defined in claim 11, further comprising the steps of:

determining the desired torque amount by selectively switching between 1) said steps of comparing a desired DC voltage with the measured DC voltage to determine a voltage error amount and determining a desired torque amount, as an output of the voltage regulator, so as to reduce the voltage error amount; and 2) obtaining a desired generator shaft torque amount and converting the desired generator shaft torque amount to the desired torque amount by a mapping function.

13. A method as defined in claim 11, wherein said step of calculating a flux in the generator using the currents and the voltages obtained by said steps of transforming so as to obtain a magnitude and position of the flux, will result in obtaining a stator flux in the generator.

14. A method as defined in claim 13, further comprising the steps of using the stator flux magnitude in said step of comparing the calculated flux magnitude with a desired flux; and using the stator flux position in said step of transforming the d-axis voltage and the q-axis voltage to stationary reference frame n-phase voltages using the position of the flux, wherein n is substantially equal to a number of generator phases.

15. A method as defined in claim 13, further comprising the steps of calculating a rotor flux in the generator using calculated stator flux in the two phase reference frame so as to obtain a magnitude and position of the rotor flux;

using the rotor flux magnitude said step of comparing the calculated flux magnitude with a desired flux; and using the rotor flux position in said step of transforming the d-axis voltage and the q-axis voltage to stationary reference frame n-phase voltages using the position of the flux, wherein n is substantially equal to a number of generator phases.

16. A method of controlling an induction generator, said method comprising the steps of:

measuring a plurality of current amounts in the generator using a plurality of current sensors;

transforming the plurality of current amounts into a two phase reference system;

measuring a DC voltage supplied to an inverter, the inverter being operatively connected to the generator;

obtaining a desired d-axis voltage and a desired q-axis voltage;

transforming the desired d-axis voltage and the desired q-axis voltage into the two phase stationary reference system;

calculating a flux in the generator using the currents and the voltages obtained by said steps of transforming so as to obtain a magnitude and position of the flux;

comparing the calculated flux magnitude with a desired flux to determine a flux error amount, the flux error amount being input to a flux regulator;

determining a new d-axis voltage so as to reduce the flux error amount;

determining a desired torque amount by obtaining a desired generator shaft torque amount and converting the generator shaft torque amount to the desired torque amount by a mapping function;

comparing the desired torque amount with an estimated torque amount to determine a torque error amount, the torque error amount being input to a torque regulator;

determining a new q-axis voltage so as to reduce a torque error amount; and transforming the new d-axis voltage and the new q-axis voltage to stationary reference frame n-phase voltages using the position of the flux, wherein n is substantially equal to a number of generator phases.

17. A method as defined in claim 16, further comprising the steps of:

determining the desired torque amount by selectively switching between 1) said step of determining the desired torque amount by obtaining a desired generator shaft torque amount and converting the generator shaft torque amount to the desired torque amount by a mapping function; and 2) comparing a desired DC voltage with the measured DC voltage to determine a voltage error amount and determining the desired torque amount, as an output of a voltage regulator, so as to reduce the voltage error amount.

18. A method as defined in claim 16, wherein said step of calculating a flux in the generator using the currents and the voltages obtained by said steps of transforming so as to obtain a magnitude and position of the flux, will result in obtaining a stator flux in the generator.

19. A method as defined in claim 18, further comprising the steps of using the stator flux magnitude in said step of comparing the calculated flux magnitude with a desired flux; and using the stator flux position in said step of transforming the d-axis voltage and the q-axis voltage to stationary reference frame n-phase voltages using the position of the flux, wherein n is substantially equal to a number of generator phases.

20. A method as defined in claim 18, further comprising the steps of calculating a rotor flux in the generator using calculated stator flux in the two phase reference frame so as to obtain a magnitude and position of the rotor flux;

using the rotor flux magnitude said step of comparing the calculated flux magnitude with a desired flux; and using the rotor flux position in said step of transforming the d-axis voltage and the q-axis voltage to stationary reference frame n-phase voltages using the position of the flux, wherein n is substantially equal to a number of generator phases.

* * * * *